United States Patent Office 3,646,148
Patented Feb. 29, 1972

3,646,148
PROCESS FOR THE PRODUCTION OF METHYLAMINE TOGETHER WITH DIMETHYLAMINE
Edgar Enders, Cologne-Flittard, Germany, assignor to Farbenfabriken Bayer Aktiengesellschaft, Leverkusen, Germany
No Drawing. Filed Feb. 10, 1969, Ser. No. 798,100
Claims priority, application Germany, Mar. 5, 1968,
P 16 68 907.9
Int. Cl. C07c *85/00, 87/08*
U.S. Cl. 260—583 J                10 Claims

ABSTRACT OF THE DISCLOSURE

Process for producing methylamine and dimethylamine by passing a mixture of carbon monoxide, hydrogen and nitrogen over a catalyst containing uranium or thorium at a temperature of from about 300° to about 600° C.

---

It is known that a mixture of methylamine, dimethylamine and trimethylamine can be obtained by reacting methanol and ammonia together at elevated temperature, or by hydrogenating hydrogen cyanide over noble metal catalysts.

It is also known that hydrogen and nitrogen can be reacted over various catalysts to give ammonia. Unfortunately, the presence of carbon monoxide is a disadvantage and promotes losses in yield. In addition, hydrogen cyanide can be obtained by reacting together 2 parts by volume of carbon monoxide, 1 part by volume of nitrogen and 3 parts by volume of hydrogen at a temperature of about 550° C. by passing the gas mixture over uranium carbide in the presence of small quantities of oxygen.

A process for the production of methylamine together with dimethylamine has now been found in which a gas mixture consisting of carbon monoxide, hydrogen and nitrogen is passed at elevated temperature and optionally at elevated pressure over catalysts containing metallic uranium or thorium or their hydrides, nitrides or carbides, optionally in admixture with, or alloyed with, metals of Group II–B and/or Group VIII of Mendeleef's Periodic Table of the Elements.

In contrast with the conventional process for producing methylamines from methanol and ammonia, the process according to the invention enables nitrogen and water gas to be directly reacted together in one stage to yield methylamine without any need for the intermediate preparation of methanol and ammonia.

It is also novel and surprising that methylamine and, to a much lesser extent, dimethylamine can be directly obtained under the operating conditions specified from a mixture of nitrogen carbon monoxide and hydrogen which should not contain any oxygen.

Where uranium is used as a catalyst, hydrogen cyanide is also formed in small quantities although it can no longer be detected in the exhaust gases following the addition of palladium or platinum to the catalyst or in cases where palladium/uranium or platinum/uranium alloys are used. The ratio of palladium or platinum to the uranium may amount for example to from 1:30 to 1:10. Although, in cases where thorium is used as a catalyst, no appreciable quantities of hydrogen cyanide are formed, the formation of methylamine may be promoted in this case too by the addition of palladium or platinum. Uranium and thorium are with advantage used in the form of metal powders with a large surface. They may also be mixed with, or applied to, finely divided or shaped (granulated) inert materials such as asbestos, alumina, porcelain, silica, graphite, aluminium phosphate, tin dioxide, titanium dioxide or zirconium dioxide, in order to ensure packing which is as uniform and has as large a surface as possible.

It is possible by adding or alloying small quantities of zinc metal, for example, from 0.1 to 20% and preferably from 0.1 to 10% with the specified metal catalysts, to lower the necessary operating temperature of the catalyst, for example, from 350° C. to approximately 300° C. in the case of uranium. Experience has shown that the operating temperature of thorium is some 100 to 150° C. higher. As a rule, it is best to operate at temperatures in the range of from about 300 to about 600° C. preferably from about 300 to about 500° C. Instead of the metals themselves, their hydrides, nitrides or carbides may also be used either wholly or in part as the catalysts.

The reaction of the gas mixture proceeds along the lines specified at pressures as low as normal. Following the contraction in volume during the reaction:

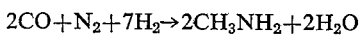
$$2CO + N_2 + 7H_2 \rightarrow 2CH_3NH_2 + 2H_2O$$

it is promoted by the application of excess pressure, for example, from about 50 to about 600 atms. (and preferably from about 50 to about 300 atms.).

The composition of the gas mixture may fluctuate within wide limits. For example, it is possible to use a mixture containing 20% of carbon monoxide, 10% of nitrogen and 70% of hydrogen as shown in the above equation.

It is also possible, however, to react one of the components as completely as possible and to use smaller quantities of one or two components, for example, from 2 to 20% of nitrogen and from 2 to 30% of carbon monoxide, the remainder being hydrogen. The residence time of the gas mixture to be reacted over the catalyst may amount, for example, to from 1 to 20 seconds.

The yield of methylamine from a single run under a pressure of approximately 100 atms. amounts to 5% for example. Methane, carbon dioxide and higher hydrocarbons are obtained as secondary products in yields of from 0.1 to 2.0.

EXAMPLE 50 parts by weight of uranium powder in admixture with asbestos wool are introduced into a cylindrical contact furnace with a capacity of 50 parts by volume. Hydrogen is then introduced in the absence of pressure, and this is followed by gradual heating to approximately 300° C., until the exothermic formation of uranium hydride is complete. A mixture of 20% by volume of carbon monoxide, 10% by volume of nitrogen and 70% by volume of hydrogen is then passed through at a temperature of 350° C. and a pressure of 100 atms. at a rate of 8000 parts by volume per hour (as measured at normal pressure), corresponding to 72 milli-equivalents of nitrogen per hour.

3.7 millimols/hour of methylamine containing small quantities of dimethylamine and approximately 0.2 millimol of hydrogen cyanide are obtained in the exhaust gas.

In cases where an equivalent quantity of uranium powder containing 6% by weight of palladium is used as the catalyst, methylamine is obtained in substantially the same yield, although, in this case, hydrogen cyanide no longer is detectable in the waste gas. The mixed catalyst can be obtained by mixing uranium powder with palladium black in the proportions specified in the presence of argon or nitrogen. This gives rise to a highly exothermic reaction accompanied by the formation of an alloy. If uranium powder is mixed with 5% by weight of zinc dust and the mixture is heated under a hydrogen atmosphere to 300° C., a catalyst is obtained which gives methylamine in a yield of 5% at temperatures as low as 320° C.

If the same quantity by weight of thorium in powder form is used instead of uranium as the catalyst, 3.5 millimols/hour of methylamine are obtained at 500° C. under otherwise the same conditions.

If the aforementioned catalysts are used at normal pressure instead of 100 atms. pressure under otherwise the same conditions, there is only slight reduction in the quantity of methylamine obtained from the gas mixture.

What is claimed is:

1. Process for the production of methylamine and dimethylamine which comprises passing a gas mixture consisting of carbon monoxide, nitrogen and hydrogen over a catalyst selected from the group of uranium, thorium and the hydrides, nitrides and carbides of uranium and thorium at a temperature of from about 300° to about 600° C.

2. Process of claim 1 wherein said gas mixture consists of from 2 to 20% by volume carbon monoxide, from 2 to 20% by volume nitrogen and the balance hydrogen.

3. Process of claim 1 carried out at a pressure of from about 50 to about 600 atmospheres.

4. Process of claim 1 wherein the residence time of the gas mixture over said catalyst is from 1 to 20 seconds.

5. Process of claim 1 wherein said catalyst is admixed or alloyed with one or more metals selected from Group II–B and Group VIII of the Mendeleef Periodic Table.

6. Process of claim 5 wherein said catalyst is admixed or alloyed with palladium or platinum.

7. Process of claim 5 wherein said catalyst is admixed or alloyed with zinc.

8. Process of claim 5 wherein said catalyst is an alloy of uranium and palladium.

9. Process of claim 1 wherein said catalyst is uranium hydride.

10. Process of claim 1 wherein said catalyst is mixed with or applied to a finely divided or granulated inert material.

References Cited
UNITED STATES PATENTS 1,492,193    4/1924    Beindl _____ 23—151

CHARLES B. PARKER, Primary Examiner

R. L. RAYMOND, Assistant Examiner

U.S. Cl. X.R.

252—461, 462; 260—583 R